United States Patent [19]

Ayres et al.

[11] Patent Number: 5,726,824
[45] Date of Patent: Mar. 10, 1998

[54] HEAD POSITIONING IN A MULTI-TRACK MAGNETIC TAPE RECORDER/PLAYER

[75] Inventors: Mark R. Ayres, Boulder, Colo.; Housan Dakroub, Oklahoma City, Okla.

[73] Assignee: Exabyte Corporation, Boulder, Colo.

[21] Appl. No.: 271,330

[22] Filed: Jul. 6, 1994

Related U.S. Application Data

[63] Continuation-in-part of Ser. No. 805,299, Dec. 10, 1991, abandoned.

[51] Int. Cl.[6] .................................................. G11B 5/584
[52] U.S. Cl. .................................. 360/77.12; 360/77.01
[58] Field of Search .............................. 360/77.01, 77.12, 360/77.13, 77.14, 75

[56] References Cited

U.S. PATENT DOCUMENTS

| | | | |
|---|---|---|---|
| 4,464,650 | 8/1984 | Eastman et al. | 340/347 |
| 4,558,302 | 12/1985 | Welch | 340/347 |
| 4,786,984 | 11/1988 | Seeman | 360/31 |
| 4,802,030 | 1/1989 | Henry et al. | 360/60 |
| 4,858,039 | 8/1989 | Mintzlaff | 360/72.2 |
| 4,866,548 | 9/1989 | Rudi | 360/77 |
| 4,906,991 | 3/1990 | Fiala et al. | 341/51 |
| 5,121,270 | 6/1992 | Akudia et al. | 360/77.12 X |
| 5,257,148 | 10/1993 | Solhjell et al. | 360/77.12 X |
| 5,262,908 | 11/1993 | Iwamatsu et al. | 360/77.12 |
| 5,309,299 | 5/1994 | Crossland et al. | 360/77.12 X |
| 5,426,543 | 6/1995 | Dy et al. | 360/77.12 |
| 5,432,652 | 7/1995 | Comeaux et al. | 360/77.12 |
| 5,453,887 | 9/1995 | Negishi et al. | 360/77.01 |

*Primary Examiner*—Aristotelis M. Psitos
*Assistant Examiner*—Larry T. Cullen
*Attorney, Agent, or Firm*—Gifford, Krass, Groh, Sprinkle, Patmore, Anderson & Citkowski

[57] ABSTRACT

A method of positioning the read/write head onto a desired data track in a multi-track recorder/player utilizes a plurality of registration stripes to find the central axis of a data track. In one embodiment, each registration stripe has associated with it a recorded identification pattern or tone which may be sensed and used for identification purposes. Then, based upon the read amplitude output of the read head, the appropriate edge of a registration stripe may be detected and, from there, the read/write head moved directly onto the desired data track without any subsequent open-loop movement. In an alternative embodiment, multiple edges are sensed and used in a calculation to determine the lateral displacement associated with the longitudinal centerline of a desired data track. Preferably, a threshold value is chosen which allows the read head to sense a slight overlap between the read head and the magnetization associated with the registration stripe and the lateral displacement associated therewith, this being used in a mathematical calculation to determine an exact lateral positioning.

2 Claims, 2 Drawing Sheets

HEAD POSITIONING IN A MULTI-TRACK MAGNETIC TAPE RECORDER/PLAYER

RELATED APPLICATION

This application is a continuation-in-part of U.S. patent application Ser. No. 07/805,299, filed Dec. 10, 1991 now abandoned.

FIELD OF THE INVENTION

The technical field of the invention is that of magnetic tape recorder/players of the type used for data storage and retrieval, and more particularly, the invention relates to positioning of the read/write head in such recorder/players.

BACKGROUND OF THE INVENTION

Magnetic tape recorder/players of the type applicable to the present invention are typically used to back up data stored in conjunction with computer systems. For example, desktop computers employ non-removable or "hard" disks having data capabilities in the range of 20 to several hundred megabytes and beyond. These disks are notably faster than the removable "floppy" diskettes and provide much greater storage capacity.

Hard disk storage is very convenient, but the stored data may be lost due to operator error or mechanical or electrical failure. Thus it is best to periodically backup the data stored on disk by recording it onto another nonvolatile memory medium that can be removed from the recording device. This is feasible with floppy diskettes, but with the continuing increase in computer processing power and reduction in costs of computer hardware generally, computers are handling increasingly large programs and operating with increasing large amounts of data. At the same time, hard disk capacity is increasing rapidly, and now vastly exceeds the memory capacity of a floppy diskette. Thus, backing up data on floppy diskettes is now a very laborious process requiring tens or perhaps hundreds of diskettes.

The magnetic tape recorder/player provides an answer to the problem of backing up data stored on disk by storing data on magnetic tape included within a cartridge. A single tape cartridge will usually have sufficient data capacity to back up all the data on a single hard drive disk. Also, since these magnetic tape recorder/player generally operate at data transfer rates much greater than floppy diskettes, the back up process is much less difficult and less time consuming than other forms of back up.

The same factors that made floppy diskette back up so difficult are also pushing the limits of data storage capacity in tape cartridges. There is an increasing need for tape cartridges having larger and larger data capacity. At the same time, the nature of the computer market puts technical limits on the physical size of the magnetic tape recorder/player unit. For example, the typical desktop computer includes bays for peripheral storage units. The current industry standard is the so-called "half height" of approximately 1¾ inches and a width to accommodate either 5¼ inch or 3½ diskettes. This size restriction directly limits the maximum tape width and indirectly limits maximum tape length. Increasing data densities will rely on increasingly smaller data tracks on the magnetic tape. Smaller tracks require more precise head positioning for reliable data retrieval. Thus there is a need in the market for precise head positioning in magnetic tape recorder/players.

SUMMARY OF THE INVENTION

This invention provides a method for controlling the lateral position of a read/write head for registration with a particular desired data track in a multi-track magnetic tape recorder/player. The tape is formatted with a plurality of registration stripes that are used in positioning the read/write head for alignment with the desired data track.

The formatting process takes place as follows. First, the read/write head is used to form a plurality of registration stripes by positioning the read/write head at predetermined lateral displacements. In one embodiment, each registration stripe is centered on the lateral boundary between a corresponding pair of adjacent data tracks and separated by an equal gap therebetween, and an encoded magnetization pattern associated with each registration stripe is used to uniquely identify a particular registration stripe.

During data storage and retrieval, the read/write head is laterally positioned relative to the registration stripes using the encoded identification information. The read/write head is then moved to an edge of the registration stripe corresponding to the desired data track. This involves laterally moving the read/write head in a direction toward the edge while reading, until the amplitude of the read signal from the read/write head is less than a predetermined fraction, such as half, of an initial amplitude. This predetermined fraction of the read amplitude indicates that the read/write head is half on the registration stripe and half on the gap between registration stripes. This position corresponds to the lateral location of the desired data track. Thus, the present invention allows the tape drive to perform a positive track lock in which no subsequent open-loop movement is required after locating a positioning reference point. Thereafter the magnetic tape recorder/reproducer executes the desired data storage or retrieval operation. The data track registration operation is preferably repeated until the proper registration stripe is found by repositioning the read/write head until the registration stripe indicates the actual location of the read/write head or the proper direction to the desired location.

In an alternative embodiment of the invention a plurality of registration stripe edges are sensed with the read head and the displacements associated with those edges are recorded. Using the displacements, a calculation is carried out to determine a value representative of the displacement of the desired track. The read/write head is next moved laterally in accordance with this calculation, then transferred longitudinally into the desired data track, again without further lateral displacement. preferably, a predetermined threshold value is selected to enable the method to be less sensitive to tape and recorder/player variations.

All embodiments are applicable to tapes recorded bi-directionally. In such a case, a first set of registration stripes is formed at the beginning of the tape for data tracks recorded in the forward direction. A second set of registration stripes is formed at the end of the tape for data tracks recorded in the reverse direction.

BRIEF DESCRIPTION OF THE DRAWINGS

These and other objects and aspects of the present invention will become clear from the following description of the invention, in which.

DETAILED DESCRIPTION OF THE PREFERRED EMBODIMENT

The present invention is directed toward the accurate positioning of the read/write head in a magnetic tape recorder/player. Such recorder/player units are typically used in conjunction with tape cartridges used to provide data back up capabilities either internal or external to computer systems. In a typical configuration, the data tracks on the magnetic tape are arranged in both forward and reverse directions with respect to the longitudinal tape path, with the recorder/player usually including one or two read/write heads, one for operation in each direction of tape travel. Such recorder/player units may further support read-while-write operations in both directions as well. The invention is equally applicable to all multi-track implementations, including those intended for unidirectional use.

Broadly, the method of the invention uses two steps: first, a set of registration stripes is formed in a load zone near one end of the tape during formatting. Second, these registration stripes are used to laterally position the read/write head for data storage and retrieval.

Figure 1:
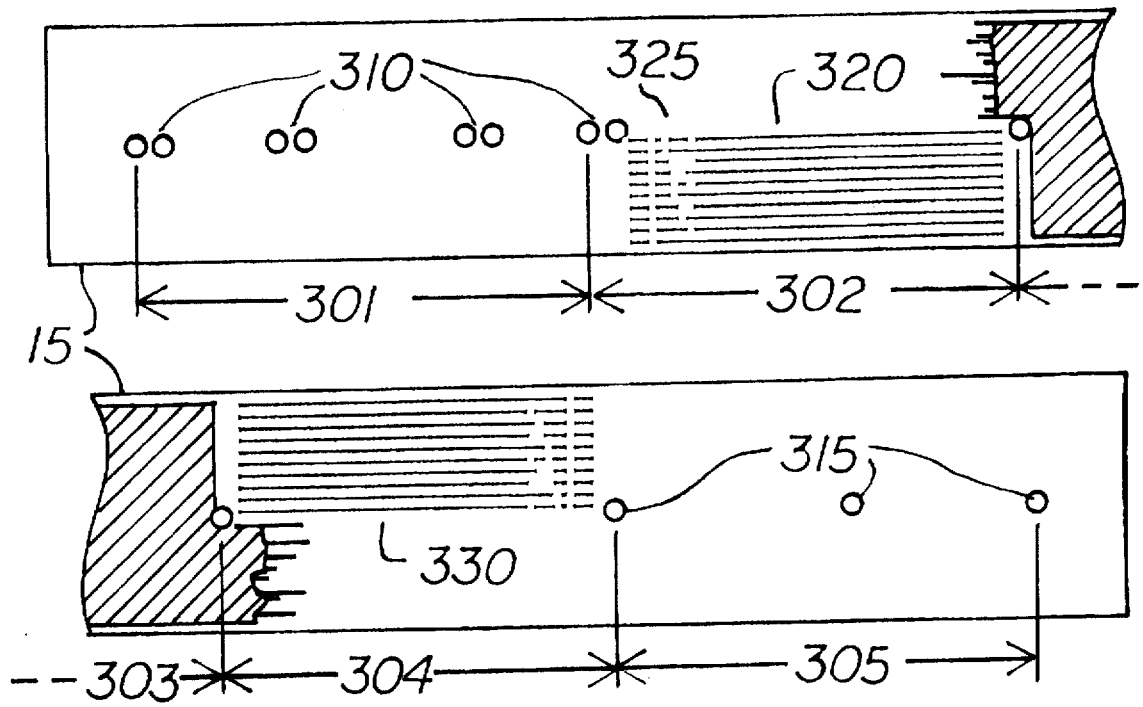
FIG. 1 illustrates portions of a magnetic tape formatted in accordance with this invention.

As illustrated in FIG. 1, tape 15 includes 5 zones: the beginning-of-tape zone 301; load zone 302; data zone 303; warning zone 304; and end of tape zone 305. Beginning of tape zone 301 is marked by a set of paired holes 310. These holes are optically detected to indicate the beginning of the tape when operating in the forward direction. A similar set of holes 315 marks the end of the tape zone 305. Holes 315 are optically detected to indicate the end of the tape when operating in the forward direction. The end of tape zone 305 is distinguished from the beginning of tape zone 301 because holes 315 occur singly and holes 310 are in pairs. In one embodiment beginning of tape zone 301 has a length of 34.5 inches, load zone 302 and warning zone 304 each have a length of 24 inches and end of tape zone 305 has a length of 27 inches. Data zone 303 has a length dependant on the desired data capacity, for example, either 300 or 400 feet. As illustrated in FIG. 1, data on the forward tracks is permitted in the beginning of warning zone 304 and on the reverse tracks into load zone 302.

Zone 302 is marked by plural registration stripes 320 made by the read/write head when tape 15 is formatted. Each registration stripe is identified according to this invention through a unique pattern of magnetized and erased portions in stripe identification section 325.

In one embodiment tape 15 has a width of 0.25 inches and includes 40 data tracks, each 6 mils in width. These 40 tracks may be divided into 20 adjacent tracks on one half of the width of the tape recorded in a forward direction and 20 adjacent tracks on the other half of the tape recorded in the reverse direction. In the preferred embodiment there are 10 registration stripes 320 located within load zone 302 used for registration on the forward recorded tracks. A similar set of 10 registration stripes 330 located in warning zone 304 are used for registration on the reverse recorded tracks.

Registration stripes 320 are formed when tape 15 is formatted in much the same manner as the data tracks. Since the entire load zone 302 must be free of previously recorded data, this entire zone is first entirely erased. The head positioning apparatus then sequences a predetermined number of steps corresponding to the particular registration stripe 320 to be recorded. While tape 15 is moving through zone 302, the modulation signal supplied to read/write head 103 is turned on and off to first record the stripe identification section 325, preferably as sections of high frequency magnetization and D.C. magnetization. Next, the modulation signal supplied to read/write head 103 is activated to continuously write high frequency magnetization for the remainder of the registration stripes through the end of zone 302.

This process is repeated for each of the registration stripes using displacement values inherent to the head positioning apparatus. Alternatively, placement may rely upon the initial edge detection for all the registration stripes. Note that the set of registration stripes 330 located in warning zone 304 are formed in a similar fashion possibly using a second set of read/write magnetic gaps in the read/write head.

Figure 2:
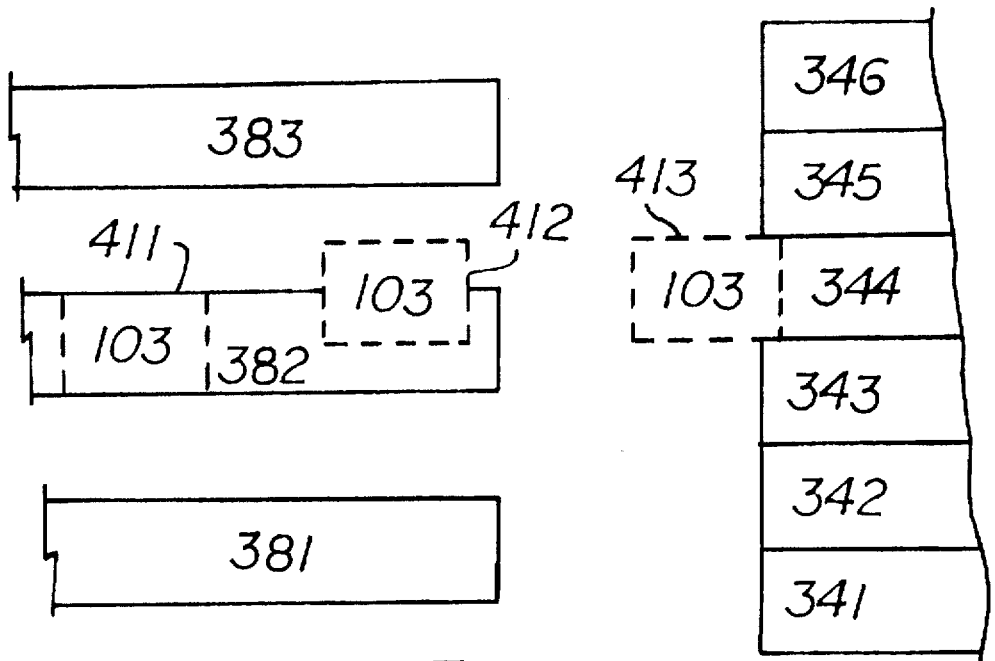
FIG. 2 illustrates the interaction between the read/write head and the registration stripes when aligning the read/write head with the desired data track.

FIG. 2 illustrates the relationship of registration stripes 381, 382 and 383 to data tracks 341, 342, 343, 345 and 346. This illustration serves as an example of the relationship of data tracks to their corresponding registration stripes. Data tracks 341 to 346 have the same width and are substantially adjacent. Registration stripes 381 to 383 have the same width as the data tracks and have gaps therebetween. These gaps have the same width as the data tracks. Registration stripes 381 to 383 are disposed with their centers offset from the centers of data tracks 341 to 346. Note that the center of registration stripe 381 is preferably aligned with the boundary between data tracks 341 and 342. Each of the other registration stripes is centered on the boundary between two corresponding data tracks. A first lower edge of registration stripe 381 is aligned with the center of data track 341. A second upper edge of registration stripe 381 is aligned with the center of data track 342.

This relationship between the registration stripes and the data tracks of the formatted tape is employed for head positioning during data recording and reproducing. First, the magnetic tape recorder/player determines the data track to be accessed. If this is a forward direction track, then tape 15 is completely rewound. The system drive controller then determines the registration stripe corresponding to the desired data track and its approximate location and steps the read/write head to that location, initiates tape movement, and senses the stripe identification section 325. Controller electronics are used to test whether the sensed stripe identification corresponds to the expected stripe identification for the selected registration stripe. If they match, then the drive controller continues the process of data track registration. If they do not match, the tape is rewound to repeat the seeking process. The drive controller stores the order of the stripe identification associated with the plural registration stripes so it can correct the anticipated location of the selected registration stripe in the proper direction relative to the initial location. This process of seeking continues until the stripe identification corresponds to the desired registration stripe or a predetermined number of failures occurs. It is expected that this registration stripe seeking process will almost always work on the first attempt. Failure to find the appropriate registration stripe will generally not occur except for unformatted cartridges.

Once the appropriate registration stripe is found, it is used to determine the lateral position of read/write head 103. This process is illustrated schematically in FIG. 2. The desired data track is track 344. Read/write head 103 is initially positioned on registration stripe 382 and proper registration is confirmed using the stripe identification. Read/write head 103 then reads registration stripe 382 while the tape is moving. The initial read amplitude at location 411 is determined. Then read/write head 103 is stepped toward the edge of registration stripe 382 corresponding to the center of data track 344. The read amplitude is continuously monitored. Upon reaching location 412, the read amplitude will be reduced to approximately one half the initial read amplitude. This reduction to one half amplitude reflects that read/write head 103 is half over registration stripe 382 and half over the unrecorded gap between registration stripes 382 and 383. This location of read/write head 103 is on the upper edge of registration stripe 382. As shown at location 413, this lateral position of read/write head 103 corresponds to the position of the desired data track 344. No subsequent open loop motion is required.

This same sequence of operations would be used for registration with any desired track. If the desired data track was data track 343, then the drive controller would step read/write head 103 down to detect the lower edge of registration stripe 382. The data tracks are disposed relative to the registration stripes so that each registration stripe edge corresponds substantially to the center of a data track. The present invention uses a simple technique for detection of the location of these registration stripe edges and thus of the data tracks.

The embodiment just described involves a unique identification code for each registration stripe formed with erased interruption portions. Those skilled in the art will realize that other methods may be employed. For example, the registration stripes could be modulated with unique modulation tones. Alternatively, the apparatus could count the number of registration stripes from a predetermined lateral displacement, such as from a known registration stripe or the edge-of-tape until the desired registration stripe is reached. In some instances the coarse positioning system will always place the read/write head on the appropriate registration stripe without the need for confirmation. In that case, the initial positioning of the read/write head relative to the corresponding registration stripe may be made in an open-loop fashion.

Note that after formatting, the tape itself includes the means for proper registration of the read/write head relative to a desired data track. As such, the edge-seeking operation ensures accurate data track registration, even if tapes formatted with a different recorder/player would result in differing alignments.

Figure 3:
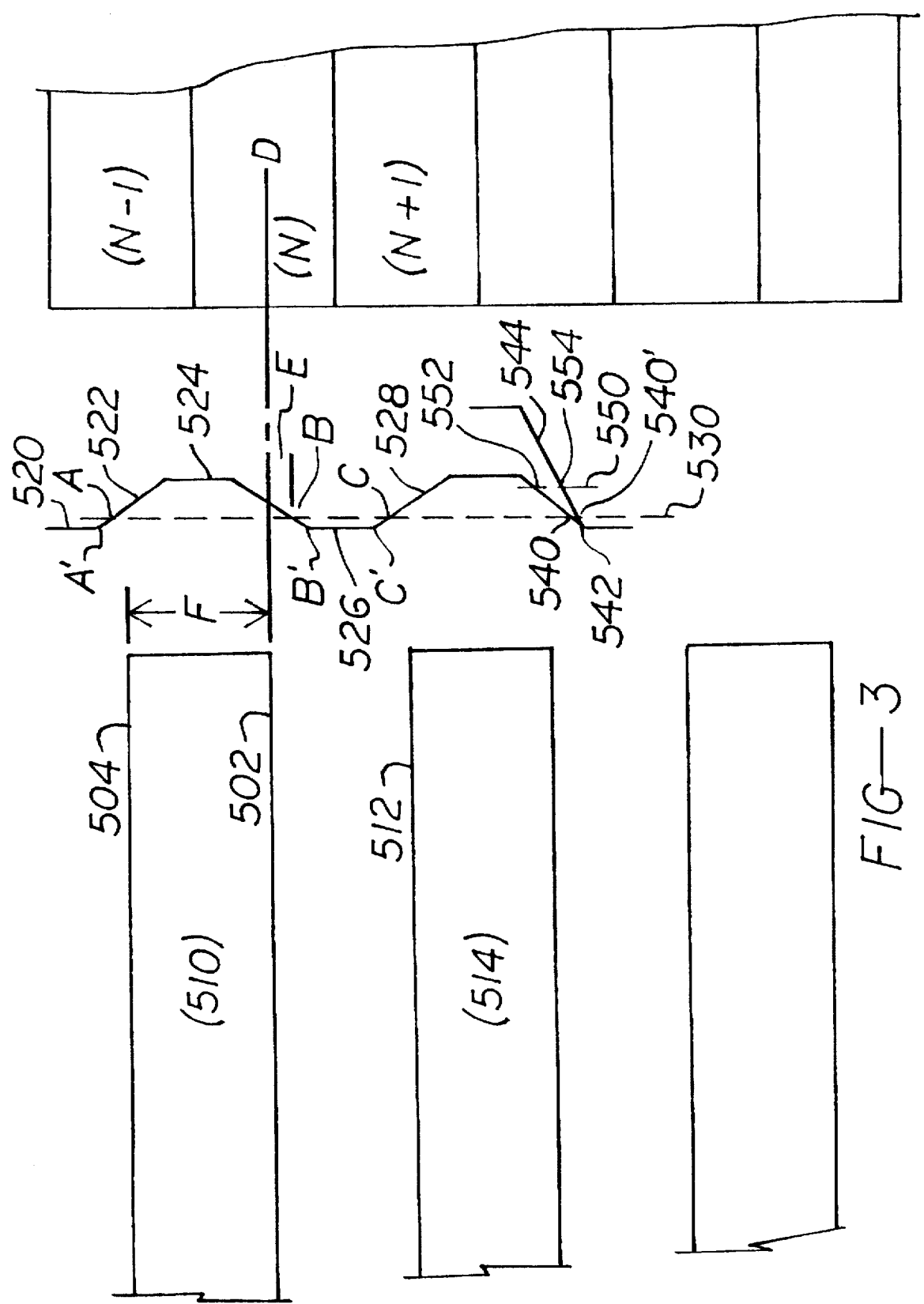
FIG. 3 illustrates an alternative embodiment of the present invention wherein three edges associated with two spaced-apart alignment stripes are used to find a desired track.

The embodiment depicted in FIG. 3 represents an alternative wherein multiple edges associated with different registration stripes are sensed, the track position is calculated, and a short open-loop movement is performed to bring the read/write head to the correct position The read/write head is again moved directly and longitudinally to the data storage section without any further open-loop movement. Although a certain amount of open-loop movement is required to move the head proximate to the central registration stripe edge in accordance with the edges on either side of it, this embodiment increases confidence, noise tolerance and drop-out resistance due to the multiple edge sampling, and thus provides for automatic compensation associated with stripe and head-with variation. This alternative embodiment also permits accurate positioning in the case where the registration stripe width is not equal to the track width, in which case the track centers do not fall exactly on the edges of the registration stripes.

In the preferred version of this alternative embodiment, the read/write head is continuously moved across a plurality of registration stripe edges while the tape is moved, resulting in a generally diagonal path across the tape, though curves may exist in this path depending upon the speed of head displacement during tape movement preferably, the head is moved across the registration stripes to sense three consecutive edges of two adjacent stripes with the final goal being to return to a point from which a desired track may be accessed accurately. In the case that the edges of the registration stripes are in perfect alignment with the edges of the data tracks, the point to which the read/write head returns prior to entry into the data section may in fact be in close proximity to the edge of a registration stripe. However, in some cases, for example if the write head is wider or narrower than the width of the finally written pitch of the data tracks, the edges of the registration stripes may not be in perfect alignment with the edges of the data tracks; however, these geometric relationships will be known at the time of formatting and may therefore be used to access a desired data track.

It should be recognized to one of skill in the art that other combinations of registration stripe edges may be sensed according to the spirit of this invention. For instance, two edges of a single registration stripe may be sensed and used mathematically to find a final position within the load zone from a desired track may be accessed, and moreover, the edges sensed need not be consecutive. For example, a set of edges associated with different registration stripes may be used along with a modified mathematical formula in order to return to a point from which a desired data track may be accessed. Additionally, although in one embodiment a substantially smooth movement of the read/write head is performed as it diagonally traverses across the registration zone, the read/write head may be displaced in various ways to improve the sensing process; for example, while the tape is moving the read/write head may be temporarily reversed as so to pass over an edge additional times to verify sensing before being moved to locate subsequent edges or lateral displacements.

Making reference to FIG. 3, assume it is desired to locate edges 504, 502 and 512 and, using these lateral displacements, calculate the position D and move the read/write head directly along line D into data track (n), which is bounded by data track (n−1) and track (n+1). Generally speaking, in order to do this, according to the invention, the read/write head will be moved laterally across the tape so as to sense and determine the location of edges 504 and 502 on stripe 510 and edge 512 of stripe 514. Based upon the displacements associated therewith, a formula will be used to determine the lateral displacement associated with the lateral position of track (n), and the read/write head will be moved to that calculated position. From that position, as with the preferred embodiment described previously, the read/write head will be moved longitudinally and directly onto the data track (n), without any further lateral open-loop movements.

More particularly, in the preferred implementation of this embodiment, displacements associated with the onset of magnetization corresponding to the registration stripe edges are used to calculate the desired track position. This approach is used since a fixed threshold value may be selected which results in greater accuracy of the onset of magnetization, as compared to the sensing and averaging of the actual amplitudes. These considerations will now be described more fully.

In FIG. 3, the waveform 520 illustrates the amplitude output signal from the read head as it moves laterally across the area of the tape containing the registration stripes 510 and 514. Assuming the head is moving from the top of the figure toward the bottom, at point A' the read/write head will just begin to sense the magnetization associated with stripe 510 at edge 504 and, assuming constant head travel, the amplitude output will steadily increase as shown by ramp 522. When the read/write head is fully over the magnetization of stripe 510, the constant output value, depicted by line 524 will be generated until the read/write head begins to move off of the stripe 510, resulting in a ramping down until point B' is reached. When the read/write head is entirely moved off of any registration stripe area, the output amplitude will bottom out to zero, as depicted by the line 526. As the read/write head continues to move, at point C, the head will begin to sense the magnetization of stripe 514 at edge 512, resulting in another ramp 528, and so on.

Using this technique, clearly the edges associated with the registration stripes correspond to lateral positions somewhere within those areas where the output amplitude ramping occurs. Depending upon threshold value selected, different points within a particular ramp may be given significance and used to calculate the desired track position D. For example, a threshold may be chosen corresponding to an exact mid-point value of the ramp, in which case the displacements associated with edges 504, 502 and 512 may simply be equal to the displacements A, B and C. However, for reasons that will become evident below, a threshold value 530 very near to the value associated with the onset of the amplitude ramp is selected. This assists in minimizing errors due to variation between recorder/player units, including variations in their read/write heads and from tape to tape.

Using this threshold value 530 close to the onset of the amplitude ramp, it is straightforward and accurate to determine points associated with the beginning or ending of the ramping, such as points A, B, and C. Assuming that the points A, B and C may be determined by comparing the output amplitude to this threshold value, the location of lateral position D associated with track (n) may be calculated in accordance with the formula: track position D=(A+2B+C)/4. Once this value is calculated, the read/write head is moved to this lateral position, then moved directly longitudinally onto the desired data track (n) with no further lateral open-loop movement. Although this technique does require some open-loop movement, the extent is extremely limited, since presumably the read/write head will only be moved to a maximum extent equal to the width of a stripe, which is equal to the width of the write head. Note also that this embodiment of the invention may also be used for tracks located adjacent the edge of the tape, in which case the value of C in FIG. 3 may not be available. In such a case, since the value of F is known to be the width of the write head, the formula may be modified as follows: track position D=(2A+2B+2F)/4.

The lower section of the amplitude waveform 520 in FIG. 3 will now be used to show why a threshold value near to the onset and termination of the output ramp amplitude yields the most accurate result in accordance with this embodiment of the invention. With the threshold positioned along broken line 530, the lateral positioning error between the sensed amplitude at point 540 and the true value associated with the ending of the ramp at point 542 is very slight. Even with an entirely different tape, one which is "hotter" in terms of its magnetization capability, resulting in a new ramp 544 previously sensed point 540 will only be moved ever so slightly to a new point 540 prime using these threshold represented by broken line 530. If, however, a much higher threshold value depicted by broken line 550 had instead been used, the ramp for one tape might be sensed at point 552 and point 554 for a different tape associated with ramp 544. As should be evident, in the event that this different threshold associated with line 550 is used, a high degree of variation will exist from tape to tape, this variation being visible in FIG. 3 as the spacing between points 552 and 554.

Having thus described my invention, we claim:

1. In a multi-track magnetic tape recorder/player having a read/write head displaceable laterally with respect to the longitudinal direction of tape travel, the method of recording at least two registration stripes and positioning the read/write head onto a desired track, comprising the steps of:

recording at least two registration stripes of equal width, the two stripes behind spaced apart at a distance bearing a predetermined, fixed relationship to the stripe width;

moving the read/write head laterally across the tape in the vicinity of the registration stripes;

using the read portion of the head sensing, three consecutive registration stripe edges;

choosing a read amplitude threshold value enabling the read head to sense and produce an output related to the point at which the read head begins to overlap with an edge of a registration stripe;

sensing lateral displacements associated with the three consecutive edges and storing information relating thereto to determine the lateral displacement of the head from the centerline of a data track;

positioning the read/write head on the tape at a lateral displacement according to the formula:

$$D=(A+2B+C)/4$$

wherein:

A is the displacement associated with the point at which the read amplitude crosses said threshold while overlapping the first consecutive edge, B is the displacement associated with the point at which the read amplitude crosses said threshold while overlapping the second consecutive edge, and C is the displacement associated with the point at which the read amplitude crosses said threshold while overlapping the third consecutive edge; and moving the read/write head longitudinally directly onto the desired track with no further lateral movement of the read/write head.

2. In a multi-track magnetic tape recorder/player having a read/write head displaceable laterally with respect to the longitudinal direction of the tape travel, the method of positioning the read/write head onto a desired track, comprising the steps of:

(a) recording a plurality of registration stripes, each stripe being of equal width, and the distance between said stripes bearing a predetermined, fixed relationship to the width of said stripes, each registration stripe further including recorded indentification indicia;

(b) using the read/write head to sense at least three edges associated with the registration stripes;

(c) recording lateral displacement information associated with the sensed registration stripe edges to determine the lateral displacement of the head from the centerline of a data track;

(d) choosing a read amplitude threshold value enabling the read head to sense a degree overlap between the read head and and edge of a registration stripe;

(e) positioning the read/write head on the tape at lateral displacement according to the formula;

$$D=(A+2B+C)/4$$

where A is the displacement associated with the point at which the read amplitude crosses said threshold while overlapping with one of the outer edges, B is the displacement associated with the point at which the read amplitude crosses said threshold while overlapping with the previously sensed edge, and C is the displacement associated with the point at which the read amplitude crosses said threshold while overlapping with the other outer edge; and (f) moving the read/write head longitudinally directly onto the desired track without further lateral movement of the read/write head.

* * * * *